United States Patent [19]

Bowling

[11] 4,141,070
[45] Feb. 20, 1979

[54] ELECTROLYTIC CAPACITORS

[75] Inventor: Edward L. Bowling, Broadway, N.C.

[73] Assignee: Cornell-Dubilier Electric Corp., Newark, N.J.

[21] Appl. No.: 142,251

[22] Filed: May 11, 1971

[51] Int. Cl.² .................. H01G 9/04; H01G 1/153
[52] U.S. Cl. ................................................. 361/433
[58] Field of Search ................... 317/230, 231, 260; 333/70; 361/433

[56] References Cited

U.S. PATENT DOCUMENTS

| 2,355,788 | 8/1944 | Dunleavey et al. | 317/230 |
| 2,884,605 | 4/1959 | Dubilier | 317/230 |
| 3,255,386 | 6/1966 | Millard et al. | 317/230 |
| 3,371,295 | 2/1968 | Baurgault et al. | 333/70 |
| 3,518,500 | 6/1970 | Jimerson et al. | 317/230 |
| 3,596,147 | 7/1971 | Zeppieri | 317/230 |

Primary Examiner—William D. Larkins
Attorney, Agent, or Firm—Paul S. Martin; Lawrence A. Hoffman

[57] ABSTRACT

An electrolytic filter capacitor of wound elongate electrode foils and an electrolyte in a separator between the foils has very low effective series resistance and inductance by virtue of particular terminal connections to the foils. A pair of wires extend across and are joined to the foils, respectively, at corresponding locations along the wound elongated foils; the ends of the wires extend oppositely to provide four terminals for the two foils, an oppositely poled pair of terminals at each end of the capacitor.

7 Claims, 5 Drawing Figures

ELECTROLYTIC CAPACITORS

This invention relates to electrolytic capacitors.

An object of the invention resides in providing wound electrolytic capacitors having foil electrodes with an electrolyte in separators between the foils, improved to yield reduced effective series inductance between input and output circuit connections to the capacitor and to achieve effective performance over a broad frequency range.

Electrolytic capacitors when used as filters are intended to smooth the applied rectified alternating current and yield minimum-ripple direct-current output. Correspondingly, the output should be sustained at a uniform potential despite a load that draws pulse currents. Improved performance under such conditions is achieved, for a given wound-foil electrolytic section, by means of terminal connections consisting of a continuous conductor such as a wire extending across each electrode foil to terminals at opposite axial ends of the wound section. The conductors are joined to the electrode foils, respectively, at corresponding locations along the foils. There are four terminals, two oppositely poled terminals at each end of the capacitor. When used as a power-supply filter capacitor, the supply is connected to one pair of oppositely poled terminals and the load is connected to the other pair of oppositely poled terminals.

The nature of the invention, including the foregoing and other novel features and advantages will be better appreciated from the following detailed description of an illustrative embodiment shown in the accompanying drawings. In the drawings.

Figure 1:
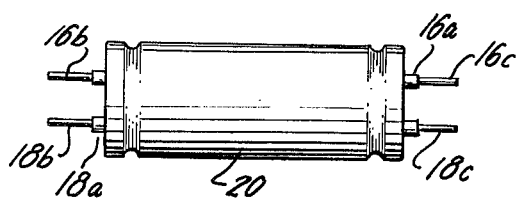
FIG. 1 is a side view of a capacitor as an illustrative embodiment of the invention.
Figure 3:
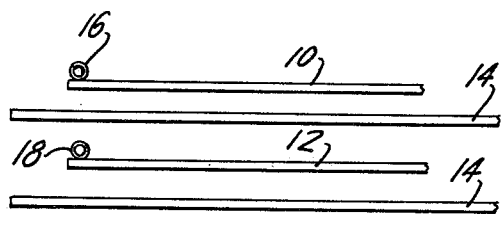
FIG. 3 is a fragmentary diagrammatic view of electrode foils, separators and terminal connection means prior to winding thereof to form a capacitor section (not shown) for the capacitor of FIGS. 1 and 2.
Figure 4:
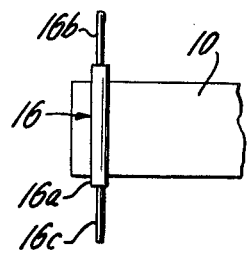
FIG. 4 is a top plan view of an electrode foil and a terminal connection to the foil, illustrative of each of the two electrodes of FIG 3.

Referring now to the drawings, FIG. 3 shows a portion of an assembly of parts to be wound into a capacitor section. This assembly includes an anodically formed foil 10, constituting an anode, a cathode foil 12, two separators 14 as of porous paper, and composite terminal wires 16 and 18. As seen in FIG. 4, terminal wire 16 includes a middle part 16a that is of a metal that can readily be welded to foil 10 and which can be anodically formed. Both of these may be of aluminum, for example. Two wires, 16b and 16c as of tinned copper are butt-welded to the ends of the aluminum wire that constitutes part 16a of the terminal means. Similarly, the terminal connection 18 to foil 12 includes a middle part 18a of wire that is welded or otherwise connected effectively to the foil, and terminal connection 18 also includes two butt-welded terminal parts 18b and 18c (FIG. 1) of tinned copper or other wire suitable for solder connection. Part 18a and foil cathode 12 can both be of aluminum, joined by staking or cold-welding.

Figure 2:
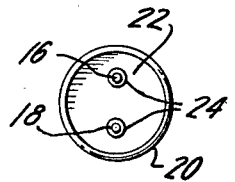
FIG. 2 is an end view of the capacitor of FIG. 1.

The electrodes are prepared in the usual manner to constitute an anode and a cathode in an electrolytic capacitor, then the parts are assembled as diagrammatically shown in FIG. 3, and the assembled parts are wound into a capacitor section. In practice, the wires 16 and 18 are close to the center of the winding, almost directly opposite each other. However, they are separated appreciably to satisfy the practical necessity of having space between the wires as they emerge from the ends of the physical capacitor (FIG. 2) through separate seals. After assembly, or after insertion into a can 20, the wound capacitor section is impregnated with an aqueous or other suitable electrolyte.

When the capacitor section is completed and inserted into can 20, composite terminal wires 16 and 18 are forced through sealing grommets 24 in an insulating disc 22 or the wires are sealed in the end cover in any other suitable manner with separating insulation between them. Each disc is suitably sealed to its end of can 20 by beading the can and turning-over the end portion of the can. The particular sealing details used are of no concern here except that seals are characteristic parts of electrolytic capacitors. The completed capacitor includes a wound and impregnated assembly of anode and cathode foils, separated by porous insulation and impregnated with electrolyte; each of the foils has a composite straight-through conductor (16 or 18) electrically and mechanically connected to its respective foil and providing opposite terminals (16b and 16c or 18b and 18c) such that the current path from one terminal to the opposite like-poled terminal (e.g. 16b to 16c) extends along a wire but does not include a length of foil or a wire-to-foil connection.

Wires 16 and 18 are close to each other, and they are disposed at corresponding parts of their respective electrodes. As a consequence the displacement currents between the input and output circuits set up magnetic fields that tend to be mutually canceling. The same is true, too, of the displacement currents entering the capacitor section from the terminals at one end of the capacitor, and the same also applies with respect to the displacement currents due to impulses in the load-current carried by the load-end terminals and into the capacitor section. The construction that develops these largely self-conceling magnetic fields reduces the inductance of the capacitor, and the effective series resistance is also held to a low value by the described construction. In any case the performance of the wound electrolytic capacitor construction is greatly improved over a two-terminal capacitor of the identical internal configuration as demonstrated by the graph in FIG. 5. This graph shows impedance of the two terminal device (transfer impedance for the four terminal capacitor) as a function of frequency. Transfer impedance is defined for a two terminal-pair network as the ratio of the voltage measured at one terminal pair to a current input at the other terminal pair. For capacitor 20, the ratio may be of the voltage measured at terminals 16b and 18b for a current at terminal 16c and 18c, or vice-versa. The impedance of the two terminal device is, of course, obtained by a conventional two terminal measurement.

Figure 5:
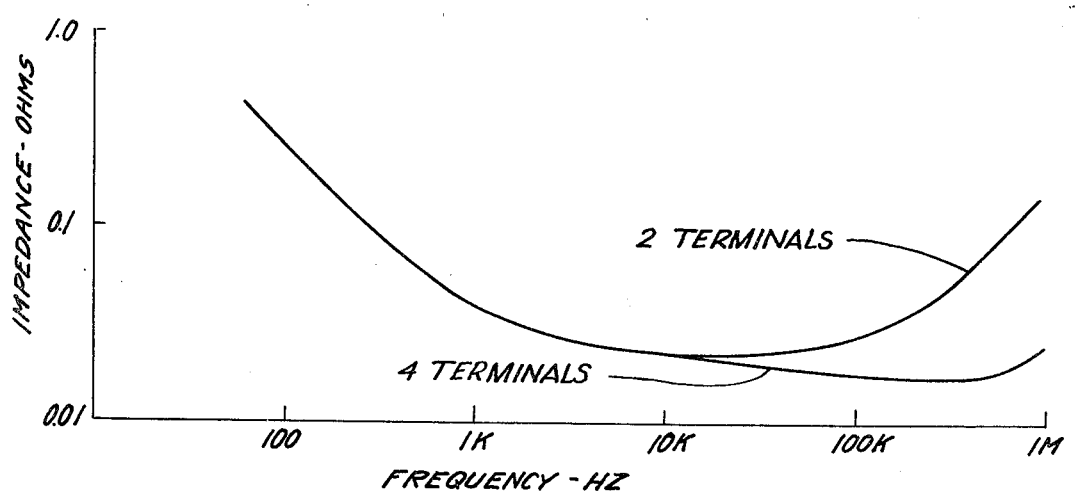
FIG. 5 is a graph of impedance versus frequency of a conventional two-terminal electrolytic capacitor and a wound four-terminal capacitor of the form in FIGS. 1 – 4.

FIG. 5 represents the performance of capacitors having a capacitance of 5900 Mfd measured at 120 Hz, rated for 30 volts D.C. Performance of two-terminal capacitors shows increasing impedance above 10,000 Hz, rising rapidly above 100,000 Hz, whereas the transfer impedance of identical capacitors having four terminals as in FIGS. 1 – 4 remains low to 1.0 Megahertz.

The arrangement in FIG. 3 of terminal wires 16 and 18 across the ends of their respective foils is attractive from practical manufacturing considerations but is not necessary. It would be desirable for the terminal wires to be joined to the respective foils at a location midway along the elongated foils, each arranged across its respective foil. The effective resistance of the capacitor section would be reduced, and the advantages of the straight-through terminal wires (providing the four terminals as discussed above) would be realized. The location of the terminal wires transversely on the foils at various places along the foils is not critical, but optimally they should have corresponding locations opposite each other, as nearly as practicable.

It is apparent that a plurality of capacitor sections each equipped with four terminals (two per electrode) as described above can be contained in a common enclosure, and the resulting terminals at each end can then be connected to form parallel-connected capacitor sections. Further, while the wires 16 and 18 are close to each other, they should ideally be as close as possible, limited by insulation requirements. Wires 16a and 18a can be flat strips (instead of round as shown) and the flat faces of these wires can be opposed to each other (separated by thin insulation) for minimized inductance.

Further variations in the capacitor described as an illustrative embodiment of the invention will occur to those skilled in the art. Therefore the invention should be construed broadly in accordance with its full spirit and scope.

What is claimed is:

1. A low impedance electrolytic filter capacitor comprising: an enclosure having sealed ends and containing means for smoothing the ripple of rectified alternating current applied thereto in an alternating-current-energized direct-current power supply and for suppressing pulse-like signals at frequencies up to at least one megahertz, said means including an assembly of two elongated wound-foil electrodes and means including an electrolyte separating said electrodes, and terminal means for said wound-foil electrodes, said terminal means including two continuous elongated metal conductors, each extending across and being joined to a respective one of said foil electrodes, each of said conductors extending through each of said ends of said enclosure to define four terminals, the joints of said conductors to said foil electrodes being made at corresponding locations along said foil electrodes, respectively; said assembly of said wound foil electrodes and said separating means having a minimum capacitance on the order of 6000 microfarads.

2. A filter capacitor in accordance with claim 1, characterized by having approximately constant transfer impedance in the frequency range from about one kilohertz through about one megahertz.

3. A filter capacitor in accordance with claim 1, for use as a shunt filter for the rectified alternating current of a direct-current supply, constructed and arranged to have an approximately uniform transfer impedance of substantially less than 0.1 ohms in the frequency range from about one kilohertz to about one megahertz.

4. A filter capacitor comprising means for smoothing the ripple of rectified alternating current applied thereto in an alternating-current-energized direct-current power supply and for suppressing pulse-like signals at frequencies up to at least one megahertz, said means including a pair of metallic strips said metallic strips including an anodically formed foil and means separating said metallic strips from each other, said separating means including an electrolyte, said strips and said separating means being rolled up into a capacitor winding, a pair of metal members joined to and extending across said metallic strips, respectively, localized at positions that are at least close to each other along the lengths of said strips, each of said metal members having portions projecting from opposite edges of the strip to which it is joined; further comprising an enclosure including insulating means through which the portions of said metal members project separately to the exterior of the enclosure; thereby to define four terminals; said capacitor having a minimum capacitance on the order of about 6000 microfarads.

5. A filter capacitor in accordance with claim 4, wherein said metal members are of wire.

6. A filter capacitor in accordance with claim 4, wherein said metal members provide the sole connections to said metallic strips.

7. A low impedance electrolytic filter capacitor comprising: an enclosure having sealed ends and containing means for smoothing the ripple of rectified alternating current applied thereto in an alternating-current-energized direct-current power supply and for suppressing pulse-like signals at frequencies up to at least one megahertz, said means including an assembly of two elongated wound-foil electrodes and means including an electrolyte separating said electrodes, and terminal means for said wound-foil electrodes, said terminal means including two continuous elongated metal conductors, each extending across and being joined to a respective one of said foil electrodes, each of said conductors extending through each of said ends of said enclosure to define four terminals, the joints of said conductors to said foil electrodes being made at corresponding locations along said foil electrodes respectively; having an approximately uniform transfer impedance of substantially less than 0.1 ohm in the frequency range from about one kilohertz to about one megahertz.

* * * * *